(12) United States Patent
Jie et al.

(10) Patent No.: US 12,547,888 B2
(45) Date of Patent: Feb. 10, 2026

(54) METHOD, APPARATUS, DEVICE, AND STORAGE MEDIUM FOR TRAINING IMAGE SEMANTIC SEGMENTATION NETWORK

(71) Applicant: TENCENT TECHNOLOGY (SHENZHEN) COMPANY LIMITED, Guangdong (CN)

(72) Inventors: Ze Qun Jie, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1083 days.

(21) Appl. No.: 17/235,046

(22) Filed: Apr. 20, 2021

(65) Prior Publication Data

US 2021/0241107 A1 Aug. 5, 2021

Related U.S. Application Data

(63) Continuation of application No. PCT/CN2020/079470, filed on Mar. 16, 2020.

(30) Foreign Application Priority Data

Mar. 26, 2019 (CN) .......................... 201910231466.5

(51) Int. Cl.
*G06N 3/08* (2023.01)
*G06N 3/045* (2023.01)
*G06T 7/10* (2017.01)

(52) U.S. Cl.
CPC ............... *G06N 3/08* (2013.01); *G06N 3/045* (2023.01); *G06T 7/10* (2017.01); *G06T 2207/20081* (2013.01); *G06T 2207/20084* (2013.01)

(58) Field of Classification Search
CPC .......... G06N 3/08; G06N 3/045; G06N 3/084; G06T 7/10; G06T 2207/20081; G06T 2207/20084

(Continued)

(56) References Cited

U.S. PATENT DOCUMENTS 11,556,746 B1 * 1/2023 Dasgupta ................. G06N 5/04
2019/0005625 A1 1/2019 Kuybeda et al.

FOREIGN PATENT DOCUMENTS

CN 108537292 A 9/2018
CN 109978893 A 7/2019

OTHER PUBLICATIONS

Mingyuan Jiu, and Hichem Sahbi. Semi Supervised Deep Kernel Design for Image Annotation. Apr. 1, 2015, https://doi.org/10.1109/icassp.2015.7178151. Accessed Mar. 22, 2024. (Year: 2015).*

(Continued)

*Primary Examiner* — Stephen S Hong
*Assistant Examiner* — Broderick C Anderson
(74) *Attorney, Agent, or Firm* — Banner & Witcoff, Ltd.

(57) ABSTRACT

A method for training an image semantic segmentation network is provided. The method includes: training a first image semantic segmentation network based on a training image set, training images in the training image set including annotation information; performing mask processing on network weights of the first image semantic segmentation network by using a mask network, to obtain a second image semantic segmentation network, the mask network being configured to select network weights in the first image semantic segmentation network that are insensitive to a distribution of image features in the training image set; and training the second image semantic segmentation network based on the training image set and a test image set, the distribution of image features in the training image set being (Continued)

different from a distribution of image features in the test image set.

19 Claims, 9 Drawing Sheets

(58) Field of Classification Search
USPC .......................................................... 706/15
See application file for complete search history.

(56) References Cited

OTHER PUBLICATIONS

Anwar, Sajid, and Wonyong Sung. Coarse Pruning of Convolutional Neural Networks with Random Masks. Apr. 24, 2017. Accessed May 6, 2024. (Year: 2017).*
Mancini, Massimiliano, et al. "Adding New Tasks to a Single Network With Weight Transformations Using Binary Masks." Lecture Notes in Computer Science, Jun. 2018, pp. 180-189. https://doi.org/10.1007/978-3-030-11012-3_14. (Year: 2018).*
Hung, Wei-Chih, et al. 'Adversarial Learning for Semi-Supervised Semantic Segmentation'. arXiv [Cs.CV], 2018, http://arxiv.org/abs/1802.07934. arXiv. (Year: 2018).*
Li, Xingjian, et al. "Delta: Deep Learning Transfer Using Feature Map with Attention for Convolutional Networks." International Conference on Learning Representations, Jan. 1, 2019. (Year: 2019).*
Mallya et al., "Piggyback: Adapting a Single Network to Multiple Tasks by Learning to Mask Weights", Internet <URL:https://arxiv.org/pdf/1801.06519.pdf>, Mar. 16, 2018, Searched on May 17, 2022 (18 pages total).
Ramirez et al., "Exploiting Semantics in Adversarial Training for Image Level Domain Adaptation", Internet <URL:https://arxiv.org/pdf/1810.05852.pdf>, Oct. 13, 2018, Searched May 17, 2022 (8 pages total).
Office Action dated May 23, 2022 from the Japanese Patent Office in JP Application No. 2021-522420.
Massimiliano Mancini et al., "Adding New Tasks to a Single Network with Weight Transformations using Binary Masks", Computer Vision and Pattern Recognition (cs.CV), 2018, pp. 180-189 (9 pages total).
Korean Office Action dated Jul. 14, 2023 in Korean Application No. 10-2021-7014500.
Opbroek et al., "Weighting training images by maximizing distribution similarity for supervised segmentation across scanners", Medical Image Analysis, 2015, pp. 245-254 (10 pages total).
Wenzhu Yang et al., "Thinning of convolutional neural network with mixed pruning", IET Image Processing, 2019, vol. 13, Issue 5, pp. 779-784 (6 pages total).
Extended European Search Report issued Apr. 21, 2022 in European Application No. 20778318.4.
Translation of Written Opinion dated May 28, 2020, issued in International Application No. PCT/CN2020/079470.
Written opinion for PCT/CN2020/079470 dated May 28, 2020.
International search report for PCT/CN2020/079470 dated May 28, 2020.
Oct. 24, 2024—(EP) Office Action—App 20778318.4.
Siddhaling Urolagin et al., "Generalization Capability of Artifical Neural Network Incorporated with Pruning Method", Dec. 16, 2011, Advanced Computing, Networking and Security, Springer Berlin Heidelberg, Berlin, pp. 171-178, XP019175234, ISBN: 978-3-642-29279-8.
Song Han et al., "Learning both Weights and Connections for Efficient Neural Networks", Oct. 30, 2015, XP055396330, Retrieved from the Internet from <https://arxiv.org/pdf/1506.02626.pdf> on Aug. 4, 2017.
May 28, 2020—(PCT) International Search Report and Written Opinion—PCT/CN2020/079470.

* cited by examiner

| Test image | The training method according to the embodiments of this application is not used | The training method according to the embodiments of this application is used |

METHOD, APPARATUS, DEVICE, AND STORAGE MEDIUM FOR TRAINING IMAGE SEMANTIC SEGMENTATION NETWORK

CROSS-REFERENCE TO RELATED APPLICATION(S)

This application is a bypass continuation application of International Application No. PCT/CN2020/079470, filed on Mar. 16, 2020, which claims priority to Chinese Patent Application No. 201910231466.5 filed to the China Patent Office on Mar. 26, 2019 and entitled "METHOD, APPARATUS, DEVICE, AND STORAGE MEDIUM FOR TRAINING IMAGE SEMANTIC SEGMENTATION NETWORK", the disclosures of which are herein incorporated by reference in their entireties.

FIELD

Embodiments of the disclosure relate to the field of image semantic segmentation, and in particular, to a method, an apparatus, a device and a storage medium for training an image semantic segmentation network.

BACKGROUND

Image semantic segmentation is a technology of discriminating different objects included in an image and recognizing the category of each object. In the field of artificial intelligence, an image semantic segmentation network is generally obtained by training based on a convolutional neural network.

In the related art technologies, upon construction of an initial image semantic segmentation network based on a convolutional neural network, the initial image semantic segmentation network is trained using a training image set, and upon completion of network training, the image semantic segmentation network obtained by training is tested using a test image set, so as to determine the image semantic segmentation effect of the image semantic segmentation network. Each training image in the training image set includes annotation information, while each test image in the test image set does not include annotation information, and the annotation information refers to the category of an object to which a pixel in the image belongs.

However, the image semantic segmentation network trained using the foregoing method is sensitive to feature distribution of images. When the distribution of the training image set is inconsistent with that of the test image set, the accuracy of a test result obtained after the test image set is tested using the image semantic segmentation network is relatively low.

SUMMARY

According to various example embodiments provided in the disclosure, provided are a method, an apparatus, a device and a storage medium for training an image semantic segmentation network.

A method for training an image semantic segmentation network, executed by a computer device, the method including:
training a first image semantic segmentation network based on a training image set, training images in the training image set including annotation information;
performing mask processing on network weights of the first image semantic segmentation network by using a mask network, to obtain a second image semantic segmentation network, the mask network being configured to select network weights in the first image semantic segmentation network that are insensitive to a distribution of image features in the training image set; and
training the second image semantic segmentation network based on the training image set and a test image set, test images in the test image set including no annotation information, and the distribution of image features in the training image set being different from a distribution of image features in the test image set.

An image semantic segmentation method, applicable to a computer device equipped with a target image semantic segmentation network, the target image semantic segmentation network being trained using the method as described in the foregoing aspect, the method including:
obtaining a test image in a test image set;
inputting the test image to the target image semantic segmentation network, and obtaining a target image semantic segmentation result outputted by the target image semantic segmentation network, the target image semantic segmentation result including categories corresponding to objects to which pixels in the test image belong; and
displaying, based on the target image semantic segmentation result, a segmented image corresponding to the test image, different categories of objects being annotated in the segmented image.

An apparatus for training an image semantic segmentation network, including:
at least one memory configured to store program code; and
at least one processor configured to read the program code and operate as instructed by the program code, the program code comprising:
first training code configured to cause at least one of the at least one processor to train a first image semantic segmentation network based on a training image set, training images in the training image set including annotation information;
masking code configured to cause at least one of the at least one processor to perform mask processing on network weights of the first image semantic segmentation network through a mask network, to obtain a second image semantic segmentation network, the mask network being configured to select network weights in the first image semantic segmentation network that are insensitive to a distribution of image features in the training image set; and
second training code configured to cause at least one of the at least one processor to train the second image semantic segmentation network based on the training image set and a test image set, test images in the test image set including no annotation information, and the distribution of image features in the training image set being different from a distribution of image features in the test image set.

A non-transitory computer-readable storage medium storing instructions, the instructions, when executed by one or more processors, causing the one or more processors to perform operations of the method for training an image semantic segmentation network or the image semantic segmentation method.

A computer device, including a memory and a processor, the memory storing computer-readable instructions, and the computer-readable instructions, when executed by the processor, causing the processor to perform operations of the method for training an image semantic segmentation network or the image semantic segmentation method.

A computer program product, the computer program product, when running on a computer device, causing the computer device to perform operations of the method for training an image semantic segmentation network or the image semantic segmentation method.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions in the example embodiments of the disclosure more clearly, the accompanying drawings for describing the example embodiments are briefly described hereinafter. The accompanying drawings in the following description show merely some example embodiments of the disclosure, and a person of ordinary skill in the art may obtain other accompanying drawings from these accompanying drawings without creative efforts.

DETAILED DESCRIPTION

Figure 1:
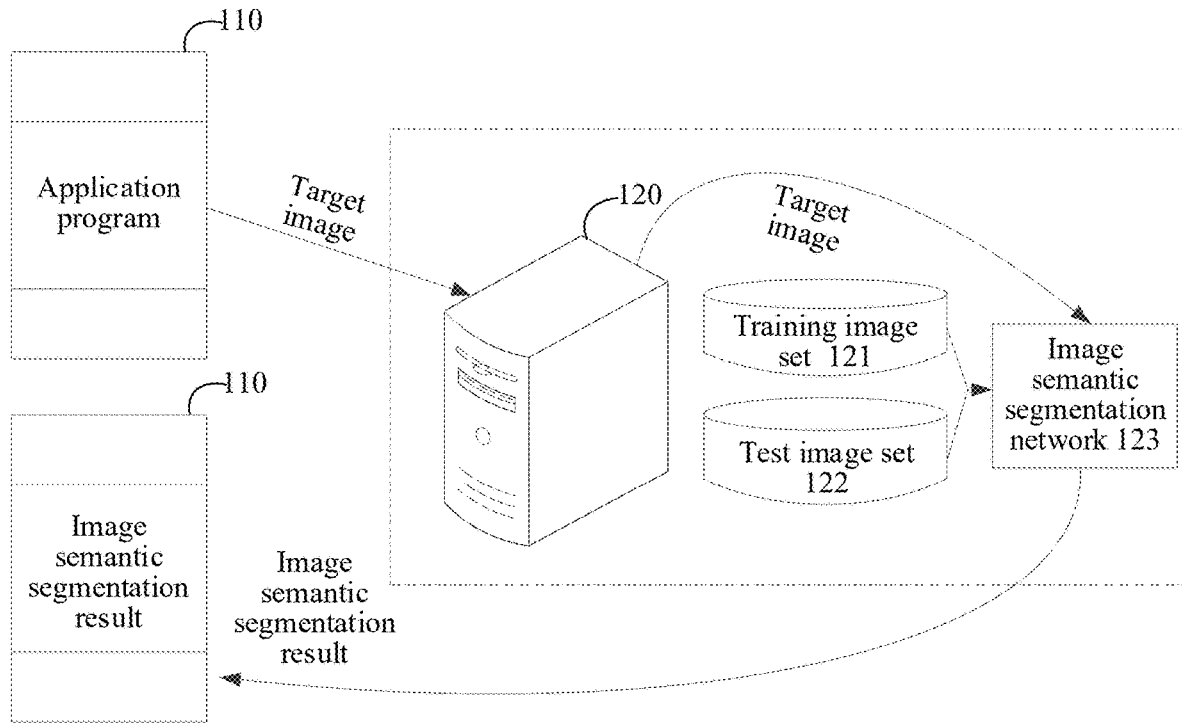
FIG. 1 is a schematic diagram of an implement environment according to an exemplary embodiment of the disclosure.

To make the objectives, technical solutions, and advantages of the disclosure clearer, the following further describes example embodiments of the disclosure in detail with reference to the accompanying drawings. It is to be understood that the specific embodiments described herein are merely used to explain the disclosure but are not intended to limit the disclosure.

For convenience of understanding, some terms in the embodiments of the disclosure are described in the following.

Network weight: In a convolutional neural network, each unit of a convolution kernel corresponds to its own network weight, which is obtained through network training. Taking a 3×3 convolution kernel as an example, the convolution kernel includes 9 units, and correspondingly, there are 9 network weights in the convolution kernel. When convolution processing is performed on pixels in an image using the convolution kernel (that is, feature extraction is performed on the image using the convolution kernel), pixel values are multiplied by the corresponding network weights in the convolution kernel, and products are added and then outputted.

Mask: The mask in the embodiments of the disclosure is configured to screen the network weights of the convolution kernel. When mask processing is performed on the convolution kernel using the mask, the pass rate of network weights that are insensitive to image feature distribution is higher than that of network weights that are sensitive to image feature distribution, so as to achieve the effect of selecting the network weights that are insensitive to image feature distribution. In an example embodiment, the mask may be a real-valued mask or a binary mask, where the binary mask is obtained by performing binarization processing on the real-valued mask.

Discriminator: It is a machine learning model for determining distribution field to which a feature belongs. The discriminator in the embodiments of the disclosure is configured to determine the distribution field (a training image set or a test image set) to which an image feature outputted by an image semantic segmentation model belongs.

In the field of image semantic segmentation, performing network training using the training image set, and then testing the trained network using the test image set is a conventional mode. In the related art technologies, after the image semantic segmentation network is trained using the training image set including annotation information, network weights of the obtained image semantic segmentation network (the convolution kernel) conform to the feature distribution of training images in the training image set. Therefore, when the feature distribution of the test images in the test image set is inconsistent with that of the training images, the image semantic segmentation network has poor generalization to the test images, which in turn affects the accuracy of the test.

For example, in the training of an image semantic segmentation network applied to the field of unmanned driving, when the training image set includes road images of city A and the test image set includes road images of city B, the effect of performing semantic segmentation on the test images using the image semantic segmentation network is poor due to different feature distributions of road images of different cities. This is caused by the inconsistent distribution of the training image set and the test image set, rather than improper training modes.

In the embodiments of the disclosure, a mask network is introduced into the training process of the image semantic segmentation network, and network weight screening is performed on the trained image semantic segmentation network using the mask network, so as to screen out the network weights that are sensitive to image feature distribution, and retain the network weights that are insensitive to image feature distribution, thereby improving the generalization of the image semantic segmentation network, obtained after the weight screening, to the test images (even if the feature distribution of the test images is inconsistent with that of the training image distribution), and improving the semantic segmentation effect of the image semantic segmentation network, obtained after the weight screening, to the test images.

The method for training an image semantic segmentation network according to the embodiments of the disclosure may be used in any of the following scenarios.

1. The method may be applied to the training scenario of a road image semantic segmentation network in the field of assisted driving. The road image semantic segmentation network may be configured to recognize road elements in road images, such as roads, guideposts, pedestrians, vehicles, and traffic lights, and transmit recognition results to a vehicle's assisted driving system, so that the assisted driving system controls the driving state of the vehicle according to the road elements. In the process of training the road image semantic segmentation network, the distributions (or feature distributions) of the training image set and the test image set may be inconsistent. For example, the images in the training image set and the test image set are acquired from different cities, in different seasons, or at different time periods. By training the road image semantic segmentation network using the method provided by the embodiments of the disclosure, the generalization of the road image semantic segmentation network to road images of different distributions may be improved, so as to improve the recognition accuracy of road elements in the road images.

2. The method may be applied to the training scenario of a face image semantic segmentation network in the field of face recognition. The face image semantic segmentation network may be configured to recognize a face in an image, so that the face in the image may be subsequently annotated, beautified, and authenticated, etc. In the process of training the face image semantic segmentation network, the distributions of the training image set and the test image set may be inconsistent. For example, the images in the training image set and the test image set correspond to different races, different skin colors, or different styles. By training the face image semantic segmentation network using the method provided by the embodiments of the disclosure, the generalization of the face image semantic segmentation network to face images of different distributions may be improved, so as to improve the recognition accuracy of faces in the images.

3. The method may be applied to the training scenario of a body image semantic segmentation network in the field of body detection. The body image semantic segmentation network may be configured to recognize a body in an image, so that a body region in the image may be subsequently annotated, the number of bodies in the image is counted, the body shapes are evaluated, etc. In the process of training the body image semantic segmentation network, the distributions of the training image set and the test image set may be inconsistent. For example, the images in the training image set and the test image set have different acquisition environments (indoor or outdoor), different races, or different body shapes, which may affect the accuracy of body detection. By training the body image semantic segmentation network using the method provided by the embodiments of the disclosure, the generalization of the body image semantic segmentation network to body images of different distributions may be improved, so as to improve the detection accuracy of bodies in the images.

Certainly, in addition to being applied to the foregoing scenarios, the method provided in the embodiments of the disclosure may also be applied to other scenarios that require training of image semantic segmentation models, especially to scenarios where the distributions of the training image set and the test image set are inconsistent. The embodiments of the disclosure are not intended to limit specific application scenarios.

In a possible implementation, a method for training an image semantic segmentation network provided by an embodiment of the disclosure may be applied to computer devices with strong data processing capabilities, such as personal computers or servers. The image semantic segmentation network trained according to the method above may be implemented as an application program or a part of the application program, and installed in a terminal, so that the terminal has an image semantic segmentation capability. Alternatively, the image semantic segmentation network trained according to the method above may be applied to a background server of the application program, so that the server provides image semantic segmentation services for the application program in the terminal.

FIG. 1 is a schematic diagram of an implement environment according to an exemplary embodiment of the disclosure. The implement environment includes a terminal 110 and a server 120. The terminal 110 is in data communication with the server 120 through a communication network. In an example embodiment, the communication network may be a wired network or a wireless network, and the communication network may be at least one of a local area network, a metropolitan area network, and a wide area network.

An application program with image semantic segmentation requirements is installed in the terminal 110. The application program may be an assisted driving application program, a monitoring application program, a photographing application program, an image matting application program, etc., which are not limited in the embodiments of the disclosure. In an example embodiment, the terminal may be a mobile terminal such as a mobile phone, a tablet computer, or a laptop portable notebook computer, or may be a terminal such as a desktop computer, a projection computer, an in-vehicle computer, etc., which are not limited in the embodiments of the disclosure.

The server 120 may be implemented as a server or as a server cluster including a group of servers, which may be a physical server or a cloud server. In a possible implementation, the server 120 is a background server of the application program in the terminal 110.

In the embodiments of the disclosure, the server 120 stores an image semantic segmentation network 123 trained according to a training image set 121 and a test image set 122. In a possible application scenario, when image semantic segmentation needs to be performed on a target image, an application program transmits the target image to the server 120 through the terminal 110. Upon reception of the target image, the server 120 inputs the target image to the image semantic segmentation network 123, and an image semantic segmentation result outputted by the image semantic segmentation network 123 is fed back to the terminal 110, and the application program in the terminal 110 analyzes and displays the image semantic segmentation result.

In other possible implementations, when the image semantic segmentation network 123 is implemented as a part of the application program in the terminal 110, the terminal 110 may perform image semantic segmentation on the target image locally, without using the server 120, thereby improving the speed of image semantic segmentation and reducing a delay caused by interaction with the server.

The process of training an image semantic segmentation network is illustrated below using an illustrative embodiment.

Figure 2:
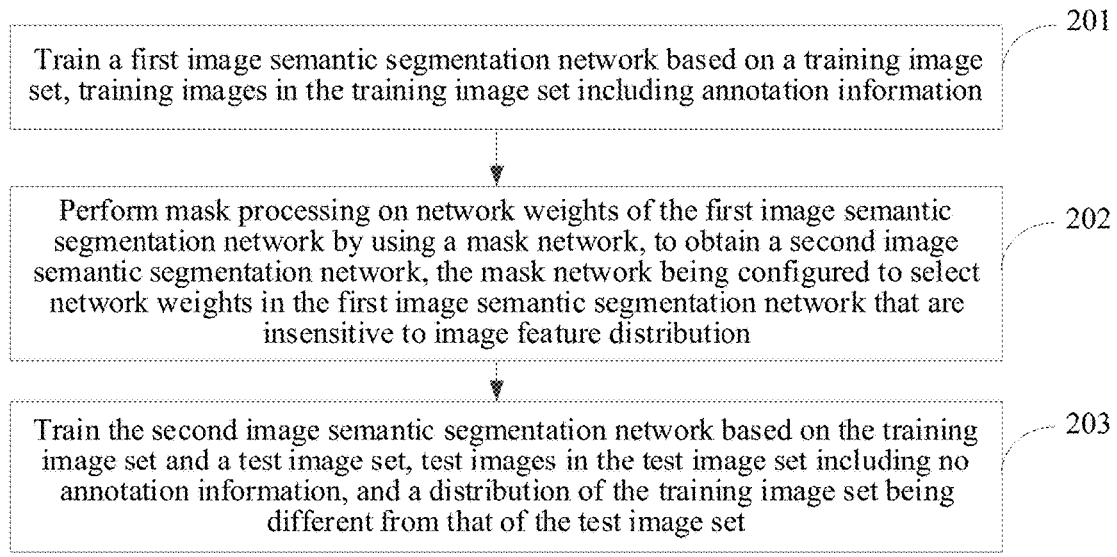
FIG. 2 is a flowchart of a method for training an image semantic segmentation network according to an exemplary embodiment of the disclosure.

FIG. 2 is a flowchart of a method for training an image semantic segmentation network according to an exemplary embodiment of the disclosure. In this embodiment, the training method is applied to a computer device as an example for description. The computer device may be the server 120 as shown in FIG. 1, and the method includes the following operations 201-204:

Operation 201. Train a first image semantic segmentation network based on a training image set, training images in the training image set including annotation information.

In different application fields, the training image sets used for training the first image semantic segmentation network are different. A plurality of illustrative application fields are illustrated below.

I. The field of assisted driving: Since the trained image semantic segmentation network is used for recognizing different road elements in images, the training images in the training image set may be road images including road elements.

II. The field of face recognition: Since the trained image semantic segmentation network is used for recognizing faces included in images, the training images in the training image set need to include faces with different angles and different expressions.

III. The field of body detection: Since the trained image semantic segmentation network is used for recognizing bodies included in images, the training images in the training image set need to include human torsos with different shapes and different angles.

In an example embodiment, the annotation information includes the category to which objects corresponding to pixels in the training image belong. For example, when the training image is a road image, the annotation information includes the category to which road elements corresponding to pixels belong, and the category may include at least one of the following: roads, guideposts, pedestrians, vehicles, and traffic lights.

In an example embodiment, the training images in the training image set are photos actually taken (subsequent manual category annotation is required), or screenshots taken from a game screen (the category of the object to which the pixels belong may be directly obtained from a game application).

Regarding the mode of training the first image semantic segmentation network, in a possible implementation, the computer device inputs the training images to a constructed initial image semantic segmentation network, and obtains a predicted category corresponding to pixels outputted by the initial image semantic segmentation network, so that parameters in the initial image semantic segmentation network are updated through a back propagation algorithm according to an error between the predicted category of the pixels and an annotated category in the annotation information, and a first image semantic segmentation model is finally obtained by training.

In an example embodiment, the first image semantic segmentation network in the embodiments of the disclosure adopts a fully convolutional network structure, which includes an input layer, a plurality of convolutional layers, and an output layer, and each convolutional layer includes a plurality of convolution kernels. The embodiments of the disclosure does not limit the specific network structure of the first image semantic segmentation network.

Schematically, a main structure of the first image semantic segmentation network is VGG16 and residual networks (ResNets).

Figure 3:
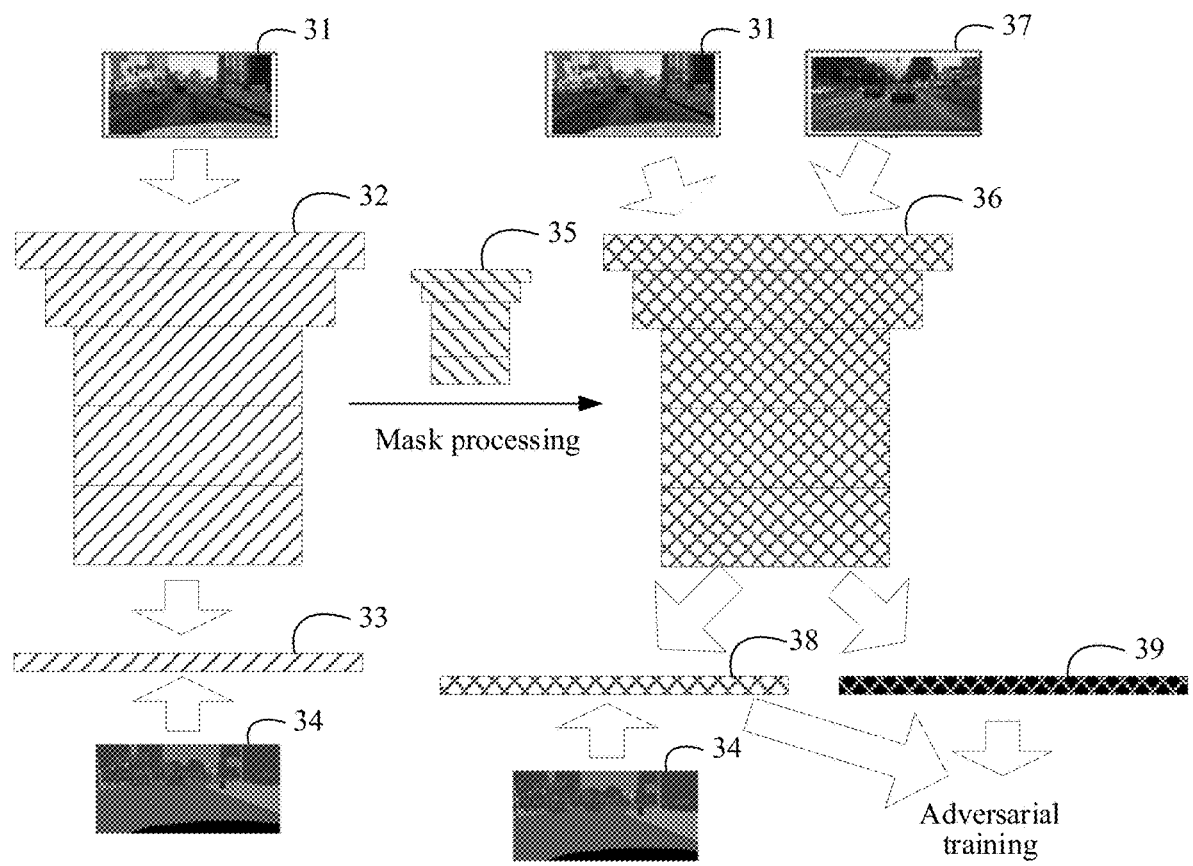
FIG. 3 is a diagram for describing the method for training an image semantic segmentation network as shown in FIG. 2.

Schematically, as shown in FIG. 3, the computer device inputs a training image 31 in the training image set to a first image semantic segmentation network 32 to obtain an outputted image feature 33, so that the first image semantic segmentation network 32 is trained based on annotation information 34 of the training image 31 and the image feature 33.

Operation 202. Perform mask processing on network weights of the first image semantic segmentation network by using a mask network, to obtain a second image semantic segmentation network, the mask network being configured to select network weights in the first image semantic segmentation network that are insensitive to image feature distribution.

In the embodiments of the disclosure, a mask network for network weight screening is introduced. After the first image semantic segmentation network is trained based on the training image set, network weight screening is performed on the first image semantic segmentation network using the mask network, instead of testing the first image semantic segmentation network directly using the test image set. Network weights that are sensitive to image feature distribution are screened out, and network weights that are insensitive to image feature distribution are retained, so as to obtain a second image semantic segmentation network that is insensitive to feature distribution.

In an example embodiment, a network structure of the mask network is the same as that of the first image semantic segmentation network, that is, the number of convolutional layers in the mask network is the same as that in the first image semantic segmentation network, and convolution kernels in the corresponding convolutional layers are the same in both size and number. Correspondingly, after the mask processing, the network structure of the second image semantic segmentation network is consistent with that of the first image semantic segmentation network.

Schematically, as shown in FIG. 3, the computer device performs mask processing on the first image semantic segmentation network 32 through a mask network 35, to obtain a second image semantic segmentation network 36.

Since the second image semantic segmentation network retains network weights that are insensitive to feature distribution, compared with the first image semantic segmentation network, the second image semantic segmentation network has better generalization to test image sets with different distributions.

Operation 203. Train the second image semantic segmentation network based on the training image set and a test image set, test images in the test image set including no annotation information, and a distribution of the training image set being different from that of the test image set.

After the second image semantic segmentation network is obtained through network weight screening, the computer device further trains the second image semantic segmentation network using the training image set and the test image set of different distributions (or different feature distributions).

In different application fields, the distribution of the training image set that is different from that of the test image set has different meanings. A plurality of illustrative application fields are illustrated below.

I. The field of assisted driving: That the distribution of the training image set is different from that of the test image set may refer to at least one of a difference in city, a difference in season, and a difference in time period. For example, when the training images in the training image set are acquired from city A and the test images in the test image set are acquired from city B, the distribution of the training image set is different from that of the test image set.

II. The field of face recognition: That the distribution of the training image set is different from that of the test image set may refer to at least one of a difference in a race, a difference in a skin color, and a difference in style (the training image set is of a realistic style, and the test image set is of a cartoon style). For example, when the training images in the training image set are images including Asian faces, and the test images in the test image set are images including European and American faces, the distribution of the training image set is different from that of the test image set.

III. The field of body detection: That the distribution of the training image set is different from that of the test image set may refer to at least one of a difference in acquisition environment, a difference in a race, and a difference in a shape. For example, when the training images in the training image set are body images acquired indoors, and the test images in the test image set are body images acquired outdoors, the distribution of the training image set is different from that of the test image set.

In a possible implementation, the computer device inputs the training images to the second image semantic segmentation network, so that parameters of the second image semantic segmentation network are updated through the back propagation algorithm according to the annotation information of the training images and the predicted category of the second image semantic segmentation network (keeping the network weights of the first image semantic segmentation network unchanged, updating the mask network, and performing, by using the updated mask network, mask processing on the first image semantic segmentation network, so as to achieve the effect of updating the second image semantic segmentation network).

Schematically, as shown in FIG. 3, the computer device inputs the training image 31 to the second image semantic segmentation network 36 to obtain an outputted first image feature 38, so that the second image semantic segmentation network 36 is trained based on annotation information 34 of the training image 31 and the first image feature 38.

In a possible implementation, the computer device inputs the training image and the test image to the second image semantic segmentation network, and trains a discriminator in an adversarial training mode to determine that the features extracted by the second image semantic segmentation network belong to the training image set or the test image set, so as to drive the second image semantic segmentation network to update to extract image features that are insensitive to distribution.

Schematically, as shown in FIG. 3, the computer device inputs the training image 31 and a test image 37 to the second image semantic segmentation network 36 to obtain the first image feature 38 corresponding to the training image 31 and a second image feature 39 corresponding to the test image 37, so as to perform adversarial training on the second image semantic segmentation network 36 based on the first image feature 38 and the second image feature 39.

In summary, in the embodiments of the disclosure, after the first image semantic segmentation network is trained based on the training image set, network weight screening is performed on the first image semantic segmentation network through the mask network to select the network weights that are insensitive to feature distribution, to obtain the corresponding second image semantic segmentation network, and then the second image semantic segmentation network is trained using the test image set and the training image set. Since the mask network may filter the network weights that are sensitive to feature distribution, even if the distribution of the training image set is different from that of the test image set, the second image semantic segmentation network obtained after the network weight screening has better generalization to the test image set, thereby improving the test accuracy of the test image set.

Figure 4:
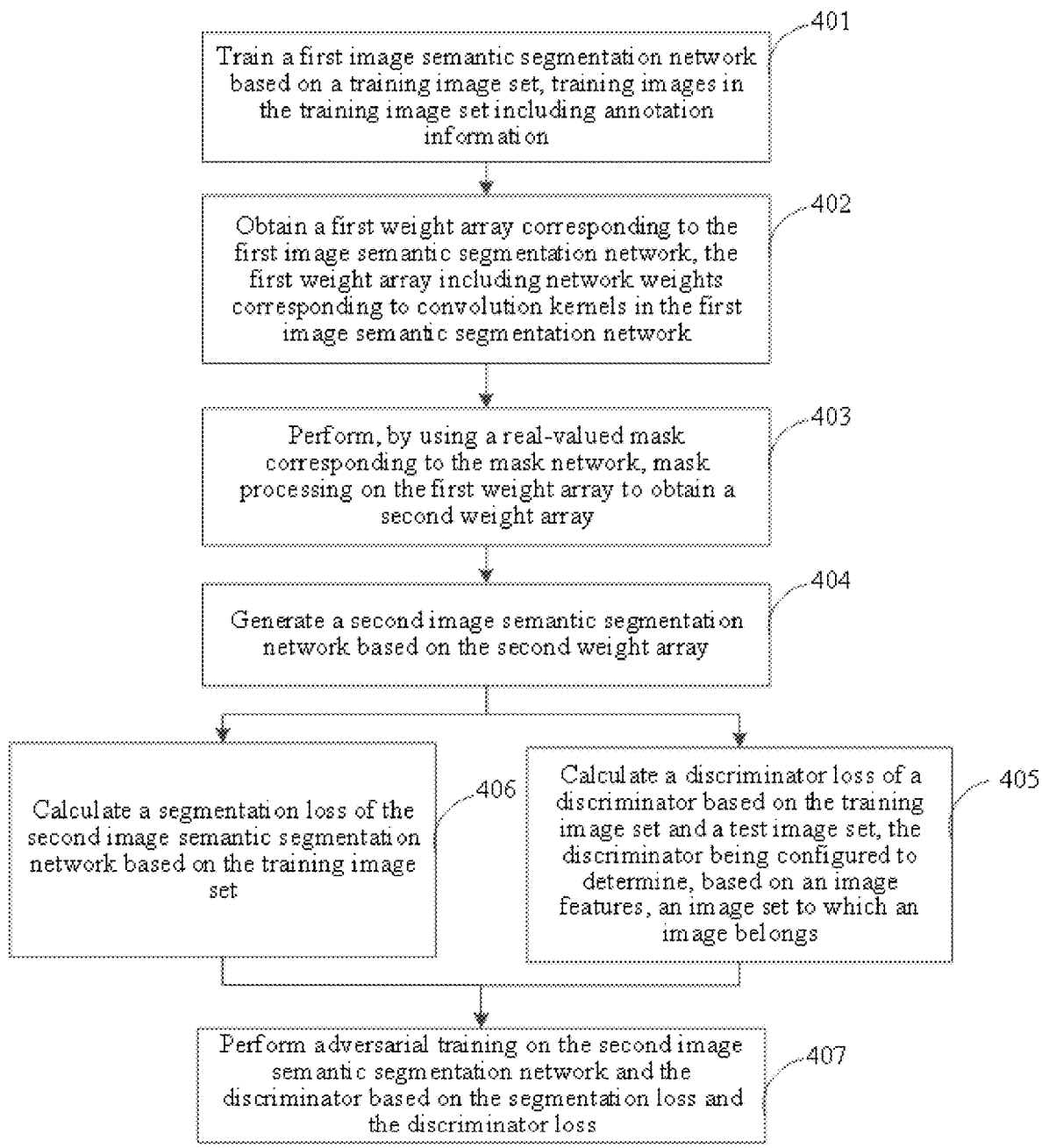
FIG. 4 is a flowchart of a method for training an image semantic segmentation network according to another exemplary embodiment of the disclosure.

In an example embodiment, the computer device trains the second image semantic segmentation model obtained after the network weight screening in an adversarial training mode, so as to improve the ability of the second image semantic segmentation network to extract features that are insensitive to distribution. FIG. 4 is a flowchart of a method for training an image semantic segmentation network according to another exemplary embodiment of the disclosure. The method includes the following operations 401-407:

Operation 401. Train a first image semantic segmentation network based on a training image set, training images in the training image set including annotation information.

For the implementation of this operation, reference may be made to operation 201.

Operation 402. Obtain a first weight array corresponding to the first image semantic segmentation network, the first weight array including network weights corresponding to convolution kernels in the first image semantic segmentation network.

In a possible implementation, the computer device obtains the network weights corresponding to the convolution kernels in the first image semantic segmentation network, and constructs the first weight array based on the network weights corresponding to the convolution kernels. In an example embodiment, the first weight array is a weight matrix including the network weights.

In an example embodiment, after the first image semantic segmentation network is trained, the network weights in the first image semantic segmentation network are fixed. In the subsequent training process, the mask network is trained to screen the network weights in the first image semantic segmentation network to obtain the second image semantic segmentation network.

Figure 5:
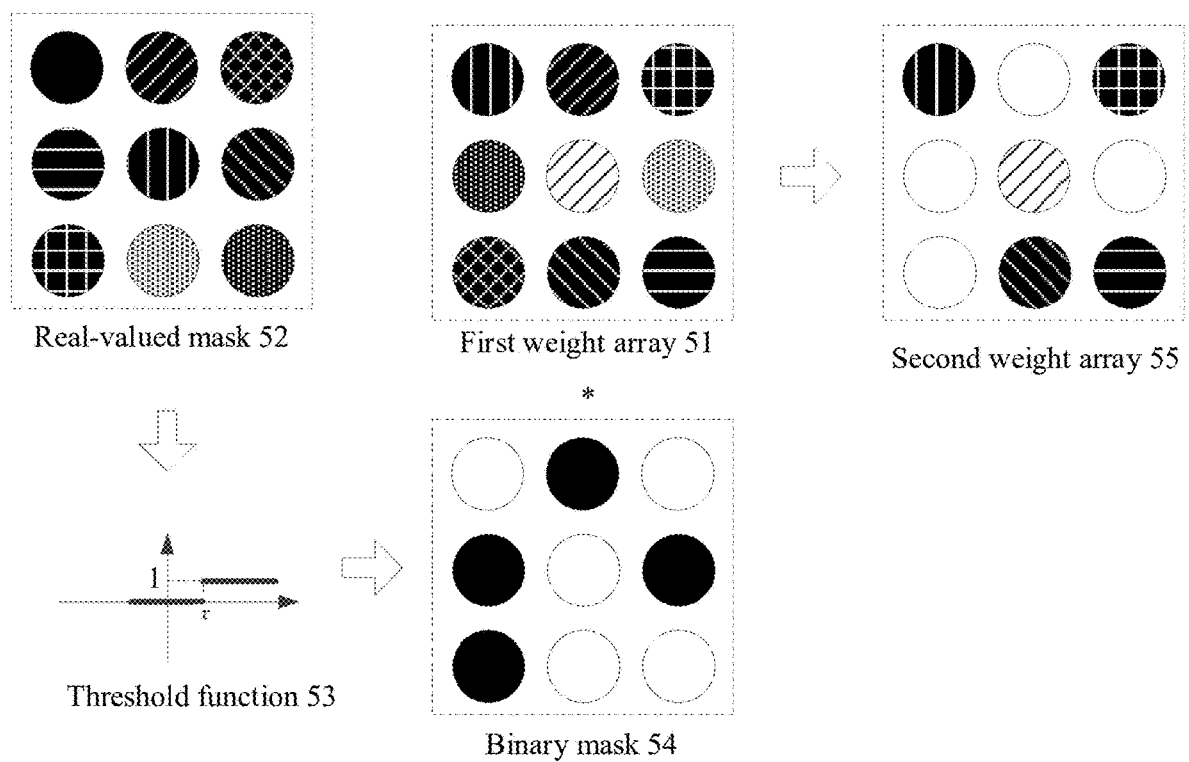
FIG. 5 is a diagram for describing performing mask processing on a first weight array by using a real-valued mask.

Schematically, as shown in FIG. 5, the computer device obtains a first weight array 51 corresponding to the first image semantic segmentation network. The first weight array 51 includes 9 network weights (denoted by circles in the array), and different patterns represent different network weights.

This embodiment describes an example of network weights corresponding to a 3×3 convolution kernel, for schematic description. In actual application, the first weight array may include a large number of network weights corresponding to the convolution kernel, which is not limited in this embodiment.

Operation 403. Perform, by using a real-valued mask corresponding to the mask network, mask processing on the first weight array to obtain a second weight array.

In the embodiments of the disclosure, a network structure of the mask network is the same as that of the first image semantic segmentation network, and the number of network weights in the mask network is the same as that in the first image semantic segmentation network. Therefore, in a possible implementation, the computer device obtains the network weights corresponding to convolution kernels in the mask network, so as to generate a real-valued mask with the same size as the first weight array. In an example embodiment, the real-valued mask is a weight matrix including network weights (in the mask network).

In the process of mask processing, in an example embodiment, the computer device performs pointwise multiplication on the real-valued mask and the first weight array to obtain the second weight array. The greater the value of a real number in the real-valued mask, the higher the pass rate of the corresponding network weight in the first weight array.

Schematically, the first weight array corresponding to the first image semantic segmentation network is $W_s$, and the real-valued mask corresponding to the mask network is $M_{real}$, and thus, the second weight array obtained after the mask processing is $W_s * M_{real}$.

Figure 6:
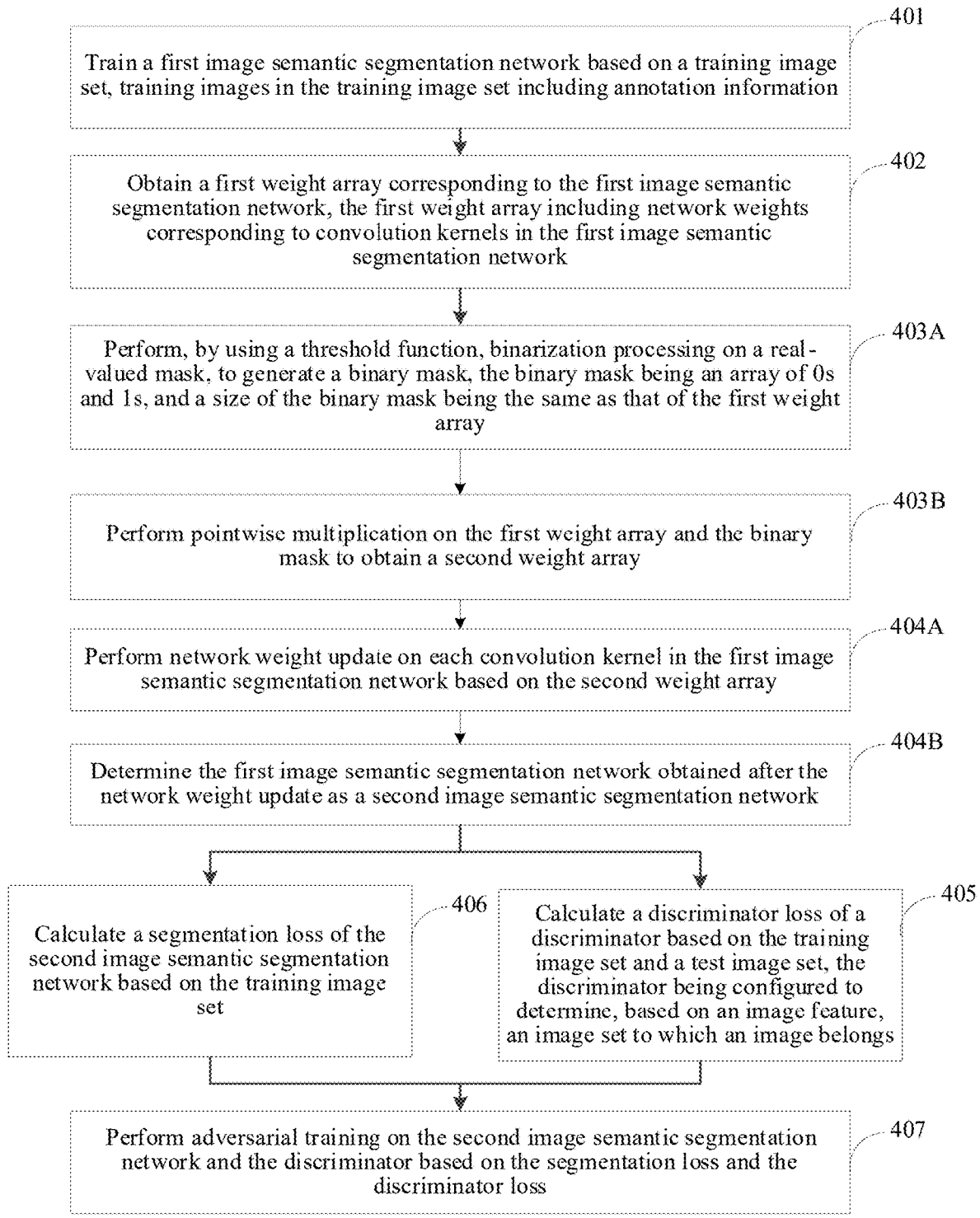
FIG. 6 is a flowchart of a method for training an image semantic segmentation network according to another exemplary embodiment of the disclosure.

During the implementation process, it is found that the effect of performing mask processing on the first weight array directly using the real-valued mask is poor. Therefore, in a possible implementation, the computer device first performs binarization processing on the real-valued mask (to achieve a filtering effect), and then performs mask processing on the real-valued mask obtained after the binarization processing. FIG. 6 is a flowchart of a method for training an image semantic segmentation network according to another exemplary embodiment of the disclosure. Hereinafter, only a difference from FIG. 4 will be described and repetitive descriptions will be avoided. As shown in FIG. 6, operation 403 may include the following operations 403A-403B:

Operation 403A. Perform, by using a threshold function, binarization processing on the real-valued mask, to generate a binary mask, the binary mask being an array of 0s and/or 1s, and a size of the binary mask being the same as that of the first weight array.

The threshold function is used for converting the real number value in the real-valued mask into 0 or 1, to obtain the binary mask corresponding to the real-valued mask. In an example embodiment, the threshold function may be represented as:

$$F_{thres}(x) = \begin{cases} 1 & \text{if } x \geq \tau \\ 0 & \text{if } x < \tau \end{cases} \quad (1)$$

Moreover, the binary mask obtained after the binarization processing $M_b$ may be represented as: $M_b = F_{thres}(M_{real})$.

In a schematic example, the real-valued mask of the mask network is initialized to 0.01, and $\tau$ is set to 0.005, that is, the value of the binary mask obtained by performing binarization processing on the initialized real-valued mask through the threshold function is 1.

Schematically, as shown in FIG. 5, after the computer device obtains a real-valued mask 52, binarization processing is performed on the real-valued mask 52 through a threshold function 53 to obtain a binary mask 54. The black filling in the binary mask 54 is used to represent a mask value '0', and the white filling is used to represent a mask value '1'.

Operation 403B. Perform pointwise multiplication on the first weight array and the binary mask to obtain the second weight array.

The computer device performs pointwise multiplication on the first weight array and the binary mask to obtain the second weight array. The pointwise multiplication refers to multiplying a network weight in an $i^{th}$ row and a $j^{th}$ column in the first weight array by a mask value in the $i^{th}$ row and the $j^{th}$ column in the binary mask.

When a mask value corresponding to the binary mask is 1, the pass rate of the corresponding network weight in the first weight array is 100%, that is, the network weight is retained. When the mask value corresponding to the binary mask is 0, the pass rate of the corresponding network weight in the first weight array is 0%, that is, the network weight is filtered, thereby achieving the effect of network weight screening.

Schematically, as shown in FIG. 5, when mask processing is performed on the first weight array 51 using the binary mask 54, since mask values corresponding to a first row and a first column, the first row and a third column, a second row and a second column, a third row and the second column, and the third row and the third column in the binary mask 54 are 1, the network weights corresponding to the first row and the first column, the first row and the third column, the second row and the second column, the third row and the second column, and the third row and the third column in the obtained first weight array 51 are retained in a second weight array 55, and the network weights corresponding to the first row and the second column, the second row and the first column, the second row and the third column, and the third row and the first column are filtered, to finally obtain the second weight array 55.

Since the network weights of the first image semantic segmentation network are fixed, after the mask network is subsequently updated, the computer device may perform mask processing on the first weight array based on the updated binary mask, so as to obtain the second weight array.

Referring back to FIG. 4, the method may include operation 404: Generate the second image semantic segmentation network based on the second weight array.

After the second weight array is obtained, the computer device generates a corresponding second image semantic segmentation network, where the second image semantic segmentation network adopts the network weights included in the second weight array. According to the examples in the operations above, the generated second image semantic segmentation network $W_m$ may be represented as: $W_m = W_s * M_b$, where $W_s$ is the first image semantic segmentation network.

As shown in FIG. 6, this operation (that is, operation 404) may include the following operations 404A-404B:

Operation 404A. Perform network weight update on each convolution kernel in the first image semantic segmentation network based on the second weight array.

Since the binary mask has the same size as the first weight array, the obtained second weight array has the same size as the first weight array. The computer device updates the corresponding network weights in first image semantic segmentation network based on the network weights included in the second weight array.

Compared with the first weight array, the network weights in the second weight array that are sensitive to feature distribution are filtered. Therefore, the image features extracted by the image semantic segmentation network using the network weights in the second weight array are insensitive to distribution (compared with the case of using the first weight array).

Operation 404B. Determine the first image semantic segmentation network obtained after the network weight update as the second image semantic segmentation network.

Furthermore, the computer device determines the image semantic segmentation network obtained after the network weight update as the second image semantic segmentation network. Compared with the first image semantic segmentation network, the network weights in the second image semantic segmentation network that are sensitive to distribution are filtered.

Referring to FIGS. 4 and 6, the method further includes operations 405-407. Operation 405: Calculate a discriminator loss of a discriminator based on the training image set and the test image set, the discriminator being configured to determine, based on an image feature, an image set to which an image belongs. For the second image semantic segmentation network, in the embodiments of the disclosure, the discriminator is trained in an adversarial training mode, to determine that the image features extracted by the network belong to the training image set or the test image set, and the second image semantic segmentation network is trained to extract image features that are insensitive to distribution from the images, so that the discriminator cannot determine the image set to which the image features belong (that is, the probability of belonging to the training image set and the test image set is 0.5).

In a possible implementation, the process that the computer device calculates the discriminator loss may include the following operations:

I. Input a target image to the second image semantic segmentation network to obtain a target image feature, the target image belonging to the training image set or the test image set.

In the embodiments of the disclosure, the discriminator constructed by the computer device is configured to determine, based on the inputted image feature, an image set to which the image belongs. Therefore, prior to the calculation of the discriminator loss of the discriminator, the target image from the training image set or the test image set needs to be inputted to the second image semantic segmentation network, and the second image semantic segmentation network performs feature extraction on the target image to obtain the corresponding target image feature.

Figure 7:
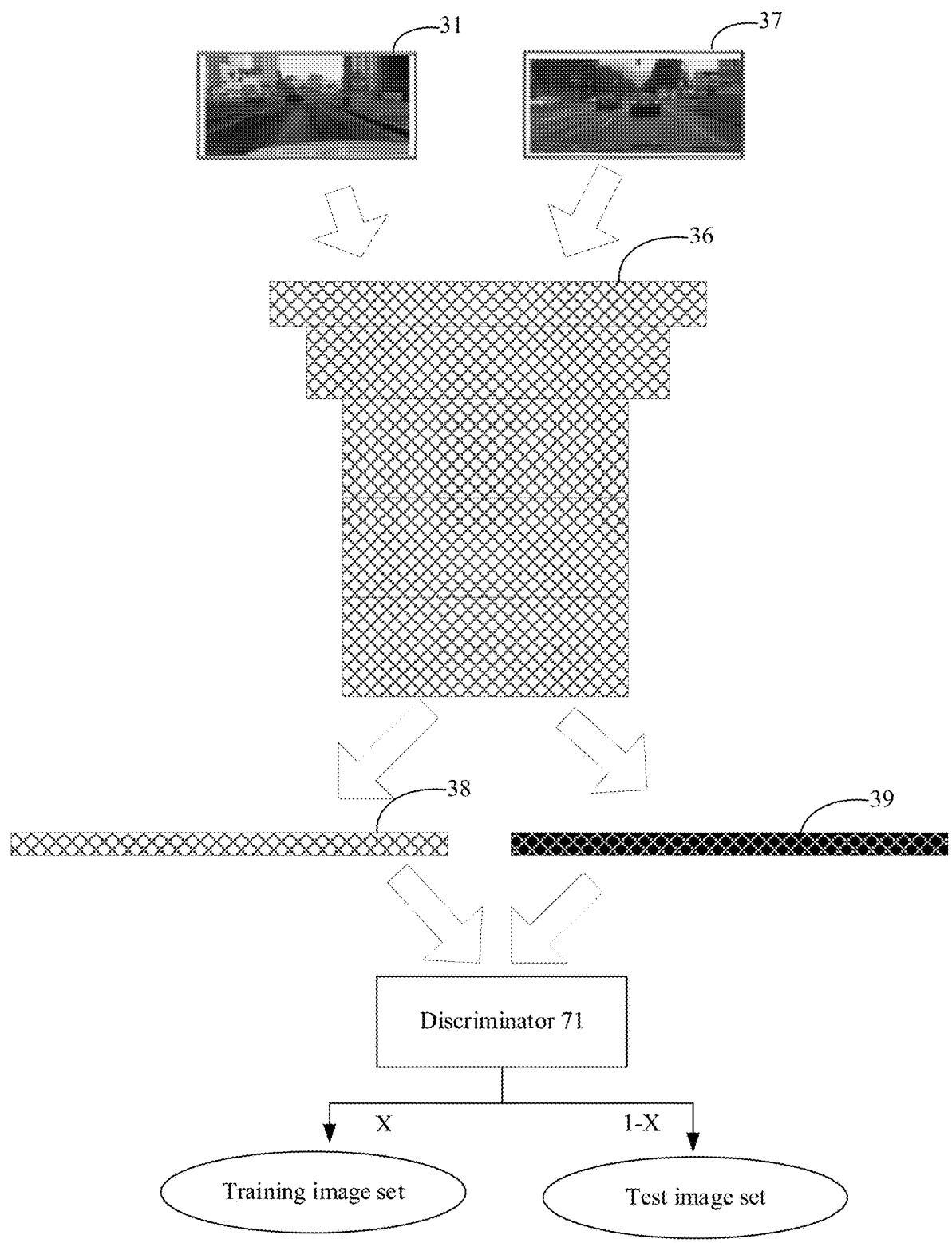
FIG. 7 is a diagram for describing determining an image set to which an image belongs by a discriminator based on an image feature.

Schematically, as shown in FIG. 7, the computer device inputs the training image 31 to the second image semantic segmentation network 36 to obtain the first image feature 38, and inputs the test image 37 to the second image semantic segmentation network 36 to obtain the second image feature 39.

II. Input the target image feature to the discriminator to obtain a discrimination result.

Furthermore, the computer device inputs the extracted target image feature to the discriminator, and obtains the discrimination result outputted by the discriminator. The discrimination result includes the probability that the target image (feature) belongs to the training image set and the probability that it belongs to the training image set.

In an example embodiment, the discriminator may adopt a fully connected convolutional neural network structure, and the embodiments of the disclosure do not limit the specific structure of the discriminator.

Schematically, as shown in FIG. 7, after the computer device inputs the first image feature 38 to the discriminator 71, the result outputted by the discriminator 71 is that: the target image has a probability of X of belonging to the training image set, and a probability of (1−X) of belonging to the test image set.

III. Calculate the discriminator loss based on the image set to which the target image belongs and the discrimination result.

The computer device calculates the discriminator loss through a discriminator loss function based on the image set to which the target image belongs in the discrimination result and the image set to which the target image actually belongs, so that parameters of the discriminator may be updated subsequently based on the discriminator loss, to improve the discrimination accuracy of the discriminator. The goal of the discriminator is that the discrimination result indicates the image set to which the target image actually belongs.

In an example embodiment, the discriminator loss function LD of the discriminator may be represented as:

$$L_D = -\sum_{h,w}(1-z)\log(1-D(P_s^m)^{(h,w)}) + z\log(D(P_t^m)^{(h,w)}) \quad (2)$$

where h, w are horizontal and vertical coordinates of each pixel in the target image, respectively, z refers to the image set to which the target image actually belongs (when the target image belongs to the training image set, z is 0, and when the target image belongs to the test image set, z is 1), $P_s^m$ is an image feature extracted from the training image by the second image semantic segmentation network, $P_t^m$ is an image feature extracted from the test image by the second image semantic segmentation network, and D is a discriminator.

Operation 406. Calculate a segmentation loss of the second image semantic segmentation network based on the training image set.

In a possible implementation, the computer device inputs the training images in the training image set to the second image semantic segmentation network, and obtains a semantic segmentation result outputted by the second image semantic segmentation network, so as to calculate a cross entropy classification loss based on the semantic segmentation result and the annotation information.

Moreover, in order to drive the second image semantic segmentation network to extract image features that are insensitive to distribution, when calculating the cross entropy classification loss of the second image semantic segmentation network, the discrimination result (adversarial loss) of the discriminator on the test image feature (obtained by extracting the test images through the second image semantic segmentation network) is also introduced, so that the cross entropy classification loss and the adversarial loss are determined as the segmentation loss of the second image semantic segmentation network.

In an example embodiment, the segmentation loss LG of the second image semantic segmentation network may be represented as:

$$L_G = -\sum_{h,w}\sum_c Y_s^{h,w,c}\log(P_s^{h,w,c}) - \sum_{h,w}z\log(D(P_t^m)^{(h,w)}) \quad (3)$$

where h, w are horizontal and vertical coordinates of each pixel in the target image, respectively, z refers to the image set to which the target image actually belongs (when the target image belongs to the training image set, z is 0, and when the target image belongs to the test image set, z is 1), $Y_s^{h,w,c}$ is a ground-truth of the pixel in the $h^{th}$ row and $w^{th}$ column of the image, $P_s^{h,w,c}$ is a predicted value of the pixel in the $h^{th}$ row and $w^{th}$ column of the image, $$-\sum_{h,w}\sum_c Y_s^{h,w,c} \log(P_s^{h,w,c})$$

is a pixel-level cross entropy classification loss, and $$-\sum_{h,w} z\log(D(P_t^m)^{(h,w)})$$

is an adversarial loss of the discriminator D.

Operation 407. Perform adversarial training on the second image semantic segmentation network and the discriminator based on the segmentation loss and the discriminator loss.

After the discriminator loss of the discriminator and the segmentation loss of the second image semantic segmentation network are determined, the terminal performs back propagation training on the parameters of the second image semantic segmentation network and the discriminator based on the segmentation loss and the discriminator loss, and when a convergence condition is satisfied, the training of the second image semantic segmentation network and the discriminator is completed.

In summary, in the embodiments of the disclosure, after the first image semantic segmentation network is trained based on the training image set, network weight screening is performed on the first image semantic segmentation network through the mask network to select the network weights that are insensitive to feature distribution, so as to obtain the corresponding second image semantic segmentation network, and then the second image semantic segmentation network is trained using the test image set and the training image set. Since the mask network may filter the network weights that are sensitive to feature distribution, even if the distribution of the training image set is different from that of the test image set, the second image semantic segmentation network obtained after the network weight screening has better generalization to the test image set, thereby improving the test accuracy of the test image set.

In addition, binarization processing is performed on the real-valued mask of the mask network through the threshold function, so that network weight screening is performed on the image semantic segmentation network using the obtained binary mask, which improves the weight screening effect and reduces the amount of calculation of weight screening, thereby improving the training speed of the image semantic segmentation network.

Moreover, by constructing the discriminator, and training the image semantic segmentation network obtained after the mask processing and the discriminator in an adversarial training mode, the ability of the image semantic segmentation network to extract image features that are insensitive to distribution is further improved, thereby improving the generalization of the image semantic segmentation network to the test image set.

In order to further improve the generalization and test accuracy of the images in the test image set, in a possible implementation, binarization processing is performed on the real-valued mask through the threshold function. After the binary mask is generated, the computer device performs pointwise multiplication on the first weight array and the binary mask to obtain an intermediate weight array, and then generates a second weight array based on the intermediate weight array and a perturbation array, where the perturbation array is used for increasing perturbation to the network weights in the intermediate weight array, and the perturbation array has the same size as the first weight array.

The mask network having the mask and the perturbation function may be represented as $M_{pm}=W_s*W_b+W_p$, where $W_b$ is the network weight of the mask network, and $W_p$ is the perturbation array.

Figure 8:
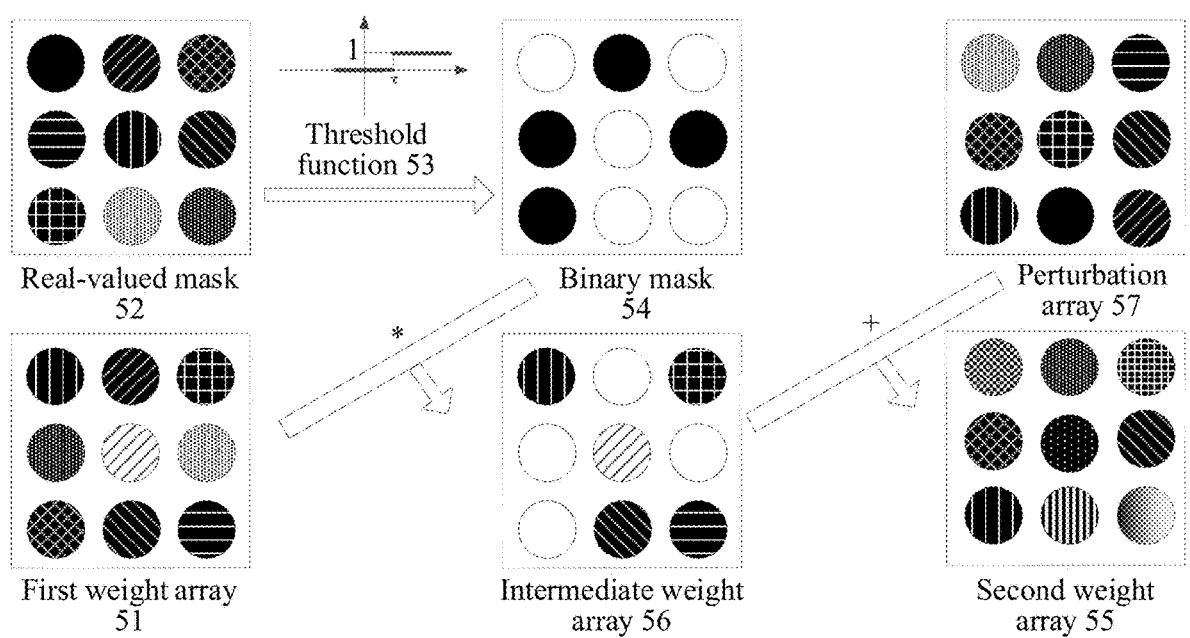
FIG. 8 is a diagram for describing performing mask processing on a first weight array and increasing perturbation.

Schematically, as shown in FIG. 8, the computer device performs binarization processing on the real-valued mask 52 through the threshold function 53, and after the binary mask 54 is obtained, pointwise multiplication is performed on the binary mask 54 and the first weight array 51 to obtain an intermediate weight array 56. Furthermore, the computer device performs pointwise addition on the intermediate weight array 56 and a perturbation array 57, to finally obtain a second weight array 55.

When the second image semantic segmentation network is subsequently trained, the real-valued mask and the perturbation array of the mask network are updated simultaneously.

After the image semantic segmentation network is trained by the training method provided in the embodiment above, the computer device may test the test image set by using the trained target image semantic segmentation network, so as to determine the image semantic segmentation quality of the network according to the semantic segmentation result.

In a possible implementation, after obtaining a test image in a test image set, the computer device inputs the test image to the target image semantic segmentation network, and obtains a target image semantic segmentation result outputted by the target image semantic segmentation network, the target image semantic segmentation result including categories corresponding to objects to which pixels in the test image belong.

Figure 9:
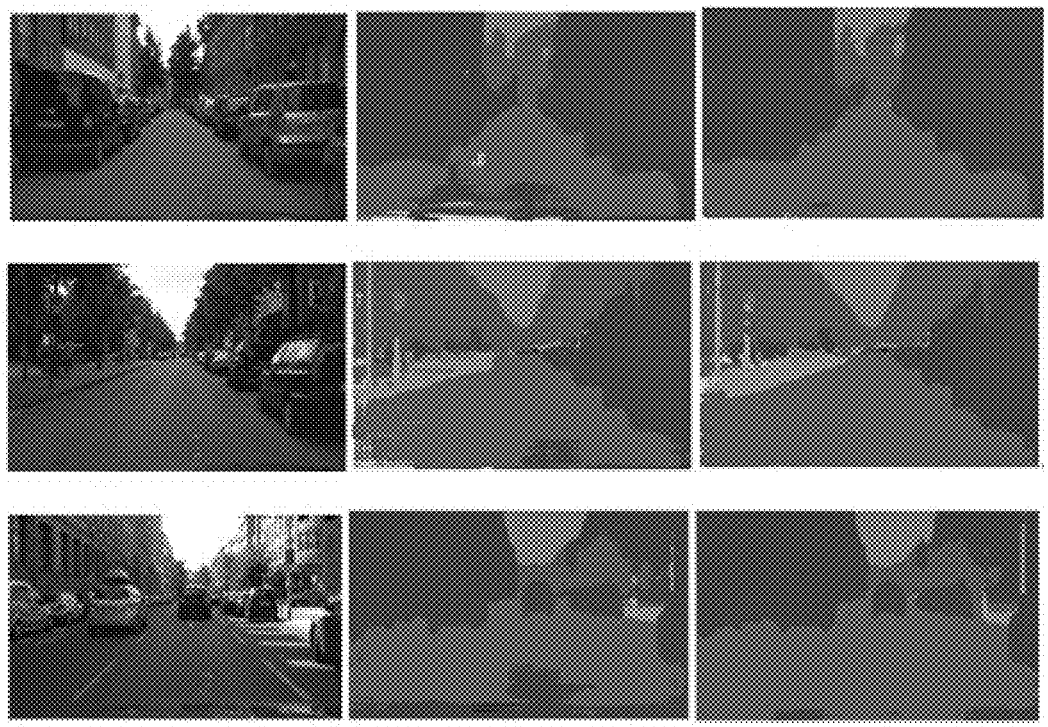
FIG. 9 illustrates a comparison of semantic segmentation effects obtained after semantic segmentation of test images.

Furthermore, the computer device displays, based on the target image semantic segmentation result, a segmented image corresponding to the test image, so as to determine the image semantic segmentation quality of the network based on the segmented image, different categories of objects being annotated in the segmented image. In an example embodiment, the computer device allocates an annotation color to each category in advance, so that each pixel is filled with the corresponding annotation color according to the category corresponding to the object to which the pixel belongs, so as to generate a segmented image corresponding to the test image. FIG. 9 illustrates a comparison of semantic segmentation effects obtained after semantic segmentation of test images. As may be seen from FIG. 9, compared with the case of not using the training method provided in the embodiments of the disclosure, after applying the training method provided in the embodiments of the disclosure, when the distribution of the test image set is different from that of the training image set, the semantic segmentation result of the image semantic segmentation network to the test images is more accurate.

Figure 10:
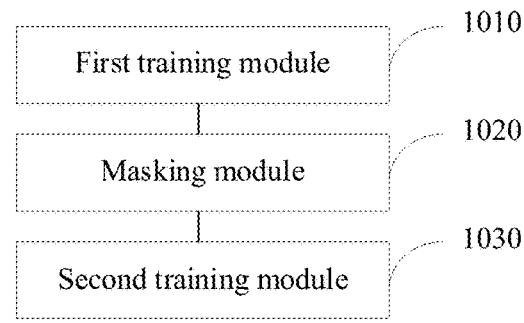
FIG. 10 is a structural block diagram of an apparatus for training an image semantic segmentation network according to an exemplary embodiment of the disclosure.

FIG. 10 is a structural block diagram of an apparatus for training an image semantic segmentation network according to an exemplary embodiment of the disclosure. The apparatus may be disposed in the computer device according to the above embodiment. As shown in FIG. 10, the apparatus includes a first training module 1010, a masking module 1020, and a second training module 1030. Modules included in the apparatus for training an image semantic segmentation network may be implemented in whole or in part by software, hardware or a combination thereof.

The first training module 1010 is configured to train a first image semantic segmentation network based on a training image set, training images in the training image set including annotation information.

The masking module 1020 is configured to perform mask processing on network weights of the first image semantic segmentation network through a mask network, to obtain a second image semantic segmentation network, the mask network being configured to select network weights in the first image semantic segmentation network that are insensitive to image feature distribution.

The second training module 1030 is configured to train the second image semantic segmentation network based on the training image set and a test image set, test images in the test image set including no annotation information, and a distribution of the training image set being different from that of the test image set.

In an embodiment, a network structure of the mask network is the same as that of the first image semantic segmentation network, and the number of network weights in the mask network is the same as that in the first image semantic segmentation network. The masking module 1020 includes an obtaining unit, a masking unit, and a generation unit.

The obtaining unit is configured to obtain a first weight array corresponding to the first image semantic segmentation network, the first weight array including network weights corresponding to convolution kernels in the first image semantic segmentation network.

The masking unit is configured to perform mask processing on the first weight array through a real-valued mask corresponding to the mask network, to obtain a second weight array, the real-valued mask including network weights corresponding to convolution kernels in the mask network.

The generation unit is configured to generate the second image semantic segmentation network based on the second weight array.

In an embodiment, the masking unit is configured to: perform binarization processing on the real-valued mask through a threshold function, to generate a binary mask, the binary mask being an array of 0s and/or 1s, and a size of the binary mask being the same as that of the first weight array; and perform pointwise multiplication on the first weight array and the binary mask to obtain the second weight array.

In an embodiment, the masking unit is further configured to: perform pointwise multiplication on the first weight array and the binary mask to obtain an intermediate weight array; and generate the second weight array based on the intermediate weight array and a perturbation array, the perturbation array being configured to increase perturbation to network weights in the intermediate weight array. In an embodiment, the generation unit is configured to perform network weight update on each convolution kernel in the first image semantic segmentation network based on the second weight array; and determine the first image semantic segmentation network obtained after the network weight update as a second image semantic segmentation network.

In an embodiment, the second training module 1030 includes a first calculation unit, a second calculation unit, and an adversarial training unit.

The first calculation unit is configured to calculate a segmentation loss of the second image semantic segmentation network based on the training image set.

The second calculation unit is configured to calculate a discriminator loss of a discriminator based on the training image set and the test image set, the discriminator being configured to determine, based on an image feature, an image set to which an image belongs.

The adversarial training unit is configured to perform adversarial training on the second image semantic segmentation network and the discriminator based on the segmentation loss and the discriminator loss.

In an embodiment, the second calculation unit is configured to: input a target image to the second image semantic segmentation network to obtain a target image feature, the target image belonging to the training image set or the test image set; input the target image feature to the discriminator to obtain a discrimination result; and calculate the discriminator loss based on the image set to which the target image belongs and the discrimination result.

In an embodiment, when the apparatus is applied to the field of assisted driving, the distribution of the training image set that is different from that of the test image set may include at least one of a difference in city, a difference in season, and a difference in time period; or when the apparatus is applied to the field of face recognition, the distribution of the training image set that is different from that of the test image set may include at least one of a difference in a race, a difference in skin color, and a difference in style; or when the apparatus is applied to the field of body detection, the distribution of the training image set that is different from that of the test image set may include at least one of a difference in acquisition environment, a difference in a race, and a difference in a shape.

Figure 11:
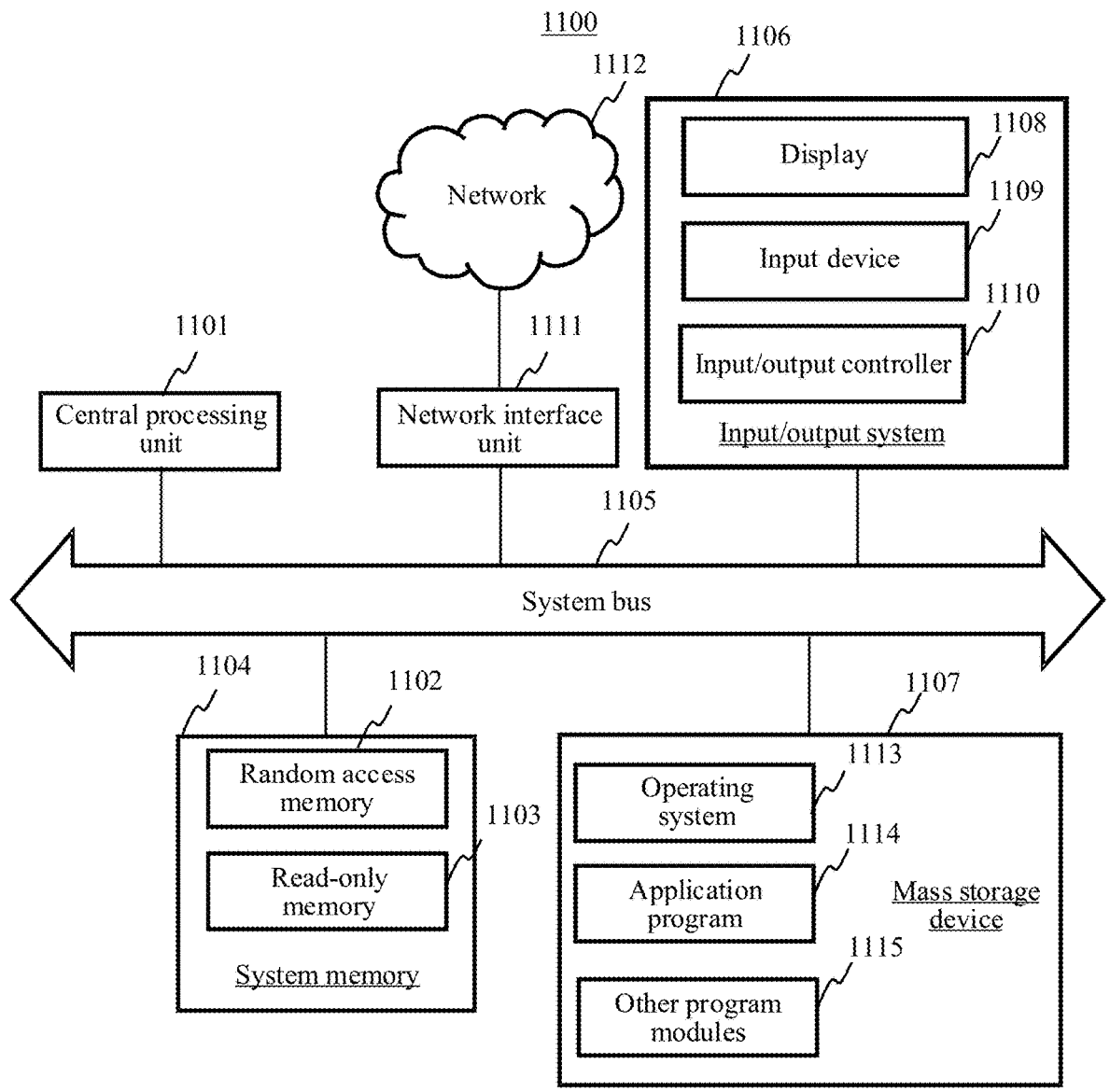
FIG. 11 is a schematic structural diagram of a computer device according to an exemplary embodiment of the disclosure.

For the apparatus for training an image semantic segmentation network according to the above embodiment, only the division of the functional modules above is taken as an example for description. In actual application, the functions above are allocated to different functional modules according to requirements, that is, an internal structure of the device is divided into different functional modules, so as to complete all or some of the functions above. In addition, the apparatus for training an image semantic segmentation network and the method for training an image semantic segmentation network according to the foregoing embodiments belong to the same concept, and the specific implementation process is detailed in the method embodiments. FIG. 11 is a schematic structural diagram of a computer device according to an exemplary embodiment of the disclosure. Specifically, a computer device 1100 includes a central processing unit (CPU) 1101, a system memory 1104 including a random access memory (RAM) 1102 and a read-only memory (ROM) 1103, and a system bus 1105 connecting the system memory 1104 and the CPU 1101. The computer device 1100 further includes a basic input/output (I/O) system 1106 assisting in transmitting information between components in the computer, and a mass storage device 1107 configured to store an operating system 1113, an application program 1114, and another program module 1115.

The basic I/O system 1106 includes a display 1108 configured to display information and an input device 1109 such as a mouse or a keyboard that is used for inputting information by a user. The display 1208 and the input device 1109 are both connected to the CPU 1101 by using an input/output controller 1110 connected to the system bus 1105. The basic I/O system 1106 may further include the input/output controller 1110 configured to receive and process inputs from a plurality of other devices such as a keyboard, a mouse, and an electronic stylus. Similarly, the input/output controller 1110 further provides an output to a display screen, a printer, or another type of output device.

The mass storage device 1107 is connected to the CPU 1101 by using a mass storage controller (not shown) connected to the system bus 1105. The mass storage device 1107 and a computer-readable medium associated therewith provide non-volatile storage to the computer device 1100. That is, the mass storage device 1107 may include the computer readable medium (not shown) such as a hard disk or a CD-ROI drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, a person skilled in art may know that the computer storage medium is not limited to the foregoing types. The system memory 1104 and the mass storage device 1107 may be collectively referred to as a memory.

The memory stores one or more programs. The one or more programs are configured to be executed by the one or more CPUs 1101 and include instructions for implementing the method for training an image semantic segmentation network, and the CPU 1101 executes the one or more programs to implement the methods provided in the foregoing method embodiments.

According to the embodiments of the disclosure, the computer device 1100 may further be connected, through a network such as the Internet, to a remote computer on the network and run. That is, the computer device 1100 may be connected to a network 1112 by using a network interface unit 1111 connected to the system bus 1105, or may be connected to another type of network or a remote computer system (not shown) by using a network interface unit 1111.

The memory further includes one or more programs. The one or more programs are stored in the memory and include operations to be executed by the computer device in the method provided in the embodiments of the disclosure.

An embodiment of the disclosure further provides a computer-readable storage medium. The computer-readable storage medium stores at least one instruction, at least one program, a code set or an instruction set. The at least one instruction, the at least one program, the code set, or the instruction set is loaded or executed by a processor to implement the method for training an image semantic segmentation model according to any of the foregoing embodiments.

The disclosure further provides a computer program product. The computer program product, when running on a computer, causes the computer to perform the method for training an image semantic segmentation model provided by the foregoing method embodiments.

In an embodiment, provided is a computer device, including a memory and a processor. The memory stores computer-readable instructions. The computer-readable instructions, when executed by the processor, cause the processor to perform operations of the method for training an image semantic segmentation network or the image semantic segmentation method. The operations of the method for training an image semantic segmentation network or the image semantic segmentation method here may be operations of the method for training an image semantic segmentation network or the image semantic segmentation method according to the foregoing embodiments.

In an embodiment, provided is a computer-readable storage medium storing computer-readable instructions. The computer-readable instructions, when executed by the processor, cause the processor to perform operations of the method for training an image semantic segmentation network or the image semantic segmentation method. The operations of the method for training an image semantic segmentation network or the image semantic segmentation method here may be operations of the method for training an image semantic segmentation network or the image semantic segmentation method according to the foregoing embodiments.

In an embodiment, provided is a computer program product. The computer program product, when executed by a computer device, causes the computer device to perform operations of the method for training an image semantic segmentation network or the image semantic segmentation method, and causes the processor to perform operations of the image processing method. The operations of the method for training an image semantic segmentation network or the image semantic segmentation method here may be operations of the method for training an image semantic segmentation network or the image semantic segmentation method according to the foregoing embodiments.

A person of ordinary skill in the art may understand that all or some of the operations of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set. The at least one instruction, the at least one program, the code set, or the instruction set is loaded or executed by the processor to implement the method for training an image semantic segmentation model according to any of the foregoing method embodiments.

In an example embodiment, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of the disclosure are merely for description purpose but do not imply the preference among the embodiments.

A person of ordinary skill in the art may understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only describe several implementations of the disclosure specifically and in detail, but cannot be construed as a limitation to the patent scope of the disclosure. For a person of ordinary skill in the art, several transformations and improvements may be made without departing from the idea of the disclosure. These transformations and improvements belong to the protection scope of the disclosure. Therefore, the protection scope of the patent of the disclosure shall be subject to the appended claims.

What is claimed is:

1. A method for training an image semantic segmentation network,
   executed by a computer device, the method comprising:
   training a first image semantic segmentation network using a training image set, training images in the training image set comprising annotation information indicating a category of object to which a pixel in a corresponding training image belongs, and without using a test image set where test images in the test image set do not have any annotation information;
   performing mask processing on network weights of the first image semantic segmentation network by using a mask network, to obtain a second image semantic segmentation network, the mask network being configured to select network weights in the first image semantic segmentation network that are insensitive to a distribution of image features in the training image set, while filtering out network weights in the first image semantic segmentation network that are sensitive to the distribution of image features in the training image set; and
   training the second image semantic segmentation network using the training image set and the test image set with no annotation information, and the distribution of image features in the training image set being different from a distribution of image features in the test image set, the second image semantic segmentation network being trained using a different set of data than the training of the first image semantic segmentation network.

2. The method according to claim 1, wherein a network structure of the mask network is the same as a network structure of the first image semantic segmentation network, and a number of network weights in the mask network is the same as a number of network weights in the first image semantic segmentation network; and
   the performing the mask processing comprises:
   obtaining a first weight array corresponding to the first image semantic segmentation network, the first weight array comprising network weights corresponding to convolution kernels in the first image semantic segmentation network;
   performing, by using a real-valued mask corresponding to the mask network, mask processing on the first weight array to obtain a second weight array, the second weight array having less weights than the first weight array, the real-valued mask comprising network weights corresponding to convolution kernels in the mask network and configured to filter out weights from the first weight array; and
   generating the second image semantic segmentation network based on the second weight array.

3. The method according to claim 2, wherein the performing the mask processing on the first weight array comprises:
   performing, by using a threshold function, binarization processing on the real-valued mask to generate a binary mask, the binary mask being an array of binary values of '0' or '1', and a size of the binary mask being the same as a size of the first weight array; and
   performing pointwise multiplication on the first weight array and the binary mask to obtain the second weight array.

4. The method according to claim 3, the method further comprising:
   performing the pointwise multiplication on the first weight array and the binary mask to obtain an intermediate weight array; and
   generating the second weight array based on the intermediate weight array and a perturbation array, the perturbation array being configured to increase perturbation to network weights in the intermediate weight array, the perturbation array being a same size as the first weight array, and
   wherein training the second image semantic segmentation network includes simultaneously updating the real-valued mask and the perturbation array of the mask network.

5. The method according to claim 2, wherein the generating the second image semantic segmentation network comprises:

updating at least one network weight on each convolution kernel in the first image semantic segmentation network based on the second weight array; and determining, as the second image semantic segmentation network, the first image semantic segmentation network obtained after updating the at least one network weight.

6. The method according to claim 1, wherein the training the second image semantic segmentation network comprises:

obtaining a segmentation loss of the second image semantic segmentation network based on the training image set;

obtaining a discriminator loss of a discriminator based on the training image set and the test image set, the discriminator being configured to determine, based on an image feature of an image, whether the image belongs to the training image set or the test image set; and performing adversarial training on the second image semantic segmentation network and the discriminator based on the segmentation loss and the discriminator loss.

7. The method according to claim 6, wherein the obtaining the discriminator loss comprises:

inputting a target image to the second image semantic segmentation network to obtain a target image feature, the target image belonging to the training image set or the test image set;

inputting the target image feature to the discriminator to obtain a discrimination result; and obtaining the discriminator loss based on an image set to which the target image belongs and the discrimination result.

8. The method according to claim 1, wherein the distribution of image features in the training image set is determined to be different from a distribution of image features in the test image set based on at least one of a difference, between the training images and the test images, in a place or a time of image acquisition, in a characteristic of an object included in an image, or in an image acquisition environment.

9. An image semantic segmentation method, applicable to a computer device equipped with a target image semantic segmentation network, the target image semantic segmentation network being trained using the method according to claim 1, the image semantic segmentation method comprising:

obtaining a test image in a second test image set;

inputting the test image to the target image semantic segmentation network, and obtaining a target image semantic segmentation result outputted by the target image semantic segmentation network, the target image semantic segmentation result comprising categories corresponding to objects to which pixels in the test image belong; and displaying, based on the target image semantic segmentation result, a segmented image corresponding to the test image, different categories of objects being annotated in the segmented image.

10. An apparatus for training an image semantic segmentation network, comprising:

at least one memory configured to store program code; and at least one processor configured to read the program code and, upon executing the program code, cause the apparatus to:

train a first image semantic segmentation network using a training image set, training images in the training image set comprising annotation information indicating a category of object to which a pixel in a corresponding training image belongs, and without using a test image set where test images in the test image set do not have any annotation information;

perform mask processing on network weights of the first image semantic segmentation network through a mask network, to obtain a second image semantic segmentation network, the mask network being configured to select network weights in the first image semantic segmentation network that are insensitive to a distribution of image features in the training image set, while filtering out network weights in the first image semantic segmentation network that are sensitive to the distribution of image features in the training image set; and train the second image semantic segmentation network using the training image set and the test image set having no annotation information, and the distribution of image features in the training image set being different from a distribution of image features in the test image set, the second image semantic segmentation network being trained using a different set of data than the training of the first image semantic segmentation network.

11. The apparatus according to claim 10, wherein a network structure of the mask network is the same as a network structure of the first image semantic segmentation network, and a number of network weights in the mask network is the same as a number of network weights in the first image semantic segmentation network; and wherein the apparatus is further caused to:

obtain a first weight array corresponding to the first image semantic segmentation network, the first weight array comprising network weights corresponding to convolution kernels in the first image semantic segmentation network;

perform mask processing on the first weight array through a real-valued mask corresponding to the mask network to obtain a second weight array, the real-valued mask comprising network weights corresponding to convolution kernels in the mask network; and generate the second image semantic segmentation network based on the second weight array.

12. The apparatus according to claim 11, wherein the apparatus is further caused to:

perform binarization processing on the real-valued mask through a threshold function, to generate a binary mask, the binary mask being an array of binary values of '0' or '1', and a size of the binary mask being the same as a size of the first weight array; and perform pointwise multiplication on the first weight array and the binary mask to obtain the second weight array.

13. The apparatus according to claim 12, wherein the apparatus is further caused to:

perform the pointwise multiplication on the first weight array and the binary mask to obtain an intermediate weight array; and generate the second weight array based on the intermediate weight array and a perturbation array, the perturbation array being configured to increase perturbation to network weights in the intermediate weight array, the perturbation array being a same size as the first weight array, and wherein training the second image semantic segmentation network includes simultaneously updating the real-valued mask and the perturbation array of the mask network.

14. The apparatus according to claim 11, wherein the apparatus is further caused to:
update at least one network weight on each convolution kernel in the first image semantic segmentation network based on the second weight array; and
determine, as the second image semantic segmentation network, the first image semantic segmentation network obtained after updating the at least one network weight.

15. The apparatus according to claim 10, wherein the apparatus is further caused to:
obtain a segmentation loss of the second image semantic segmentation network based on the training image set;
obtain a discriminator loss of a discriminator based on the training image set and the test image set, the discriminator being configured to determine, based on an image feature of an image, whether the image belongs to the training image set or the test image set; and
perform adversarial training on the second image semantic segmentation network and the discriminator based on the segmentation loss and the discriminator loss.

16. The apparatus according to claim 15 wherein the apparatus is further caused to:
input a target image to the second image semantic segmentation network to obtain a target image feature, the target image belonging to the training image set or the test image set;
input the target image feature to the discriminator to obtain a discrimination result; and
obtain the discriminator loss based on an image set to which the target image belongs and the discrimination result.

17. The apparatus according to claim 10, wherein the apparatus is further caused to:
determination code configured to cause at least one of the at least one processor to determine that the distribution of image features in the training image set is different from a distribution of image features in the test image set based on at least one of a difference, between the training images and the test images, in a place or a time of image acquisition, in a characteristic of an object included in an image, or in an image acquisition environment.

18. The apparatus according to claim 10, wherein the apparatus is further caused to:
input an image to the second image semantic segmentation network, and obtain a target image semantic segmentation result outputted by the second image semantic segmentation network, the target image semantic segmentation result comprising categories corresponding to objects to which pixels in the image belong; and
display, based on the target image semantic segmentation result, a segmented image corresponding to the image, different categories of objects being annotated in the segmented image.

19. A non-transitory computer-readable storage medium storing instructions, the instructions, when executed by one or more processors, causing at least one of the one or more processors to perform:
training a first image semantic segmentation network using a training image set, training images in the training image set comprising annotation information indicating a category of object to which a pixel in a corresponding training image belongs, and without using a test image set where test images in the test image set do not have any annotation information;
performing mask processing on network weights of the first image semantic segmentation network by using a mask network, to obtain a second image semantic segmentation network, the mask network being configured to select network weights in the first image semantic segmentation network that are insensitive to a distribution of image features in the training image set, while filtering out network weights in the first image semantic segmentation network that are sensitive to the distribution of image features in the training image set; and
training the second image semantic segmentation network using the training image set and the test image set having no annotation information, and the distribution of image features in the training image set being different from a distribution of image features in the test image set, the second image semantic segmentation network being trained using a different set of data than the training of the first image semantic segmentation network.

* * * * *